United States Patent
Solheim et al.

(10) Patent No.: US 7,353,690 B2
(45) Date of Patent: Apr. 8, 2008

(54) ATMOSPHERIC REFRACTIVITY PROFILING APPARATUS AND METHODS

(75) Inventors: Fredrick S. Solheim, Boulder, CO (US); Randolph H. Ware, Boulder, CO (US); Michael L. Exner, Boulder, CO (US)

(73) Assignee: Radiometrics Corporation, Boulder, CO (US)

( * ) Notice: Subject to any disclaimer, the term of this patent is extended or adjusted under 35 U.S.C. 154(b) by 391 days.

(21) Appl. No.: 11/041,160

(22) Filed: Jan. 24, 2005

(65) Prior Publication Data

US 2006/0164063 A1     Jul. 27, 2006

(51) Int. Cl.
*G01W 1/00*   (2006.01)
*G01S 13/95*  (2006.01)

(52) U.S. Cl. ............... 73/29.01; 73/170.28; 342/26 R

(58) Field of Classification Search ............. 73/170.26, 73/178 R, 29.01, 170.27; 324/640, 351, 324/26, 76.14, 29.01
See application file for complete search history.

(56) References Cited

U.S. PATENT DOCUMENTS

| | | | |
|---|---|---|---|
| 4,873,481 A | 10/1989 | Nelson et al. | |
| 5,526,676 A | 6/1996 | Solheim et al. | |
| 5,631,414 A * | 5/1997 | Cherny | ..................... 73/170.27 |
| 5,675,081 A * | 10/1997 | Solheim et al. | ........... 73/170.28 |
| 5,777,481 A * | 7/1998 | Vivekanandan | ............. 324/640 |
| 6,308,043 B1 | 10/2001 | Solheim et al. | |
| 6,377,207 B1 | 4/2002 | Solheim et al. | |
| 7,145,499 B2 * | 12/2006 | Ware et al. | ................ 342/26 R |

\* cited by examiner

*Primary Examiner*—Sang H. Nguyen
(74) *Attorney, Agent, or Firm*—Harold A. Burdick

(57) ABSTRACT

Apparatus and methods for characterizing atmospheric refractivity and its evolution in time and space utilizing passive radiation emission measurement devices are disclosed. Based on an instrument such as a passive microwave radiometer, ancillary meteorological measurements and other information and observations, the apparatus and methods provide useful signatures for characterizing atmospheric refractivity. The system can observe to any vector in the sky, giving directional as well as zenithal measurements of the refractivity profile, its spatial and temporal gradients, and the spatial and temporal trending of the profile and its gradients.

20 Claims, 6 Drawing Sheets

FIG. 4

```
┌─────────────────────────────┐
│ Refractivity profile n(h)   │──┐
│ and its derivatives         │  │      ┌───────────┐
└─────────────────────────────┘  │      │ Retrieval │      ┌──────────────┐
                                 ├─────>│ algorithm │─────>│  Retrieval   │
┌─────────────────────────────┐  │      │ training  │      │ coefficients │
│ Modeled or observed         │──┘      │  system   │      └──────────────┘
│ radiometer correlative      │         └───────────┘
│ observables                 │
└─────────────────────────────┘
```

FIG. 5

```
┌──────────────────────────────────┐
│ Real time radiometer observables:│
│   Brightness temperatures        │
│   Surface meteorology            │
│   Infrared thermometer           │
│   Other correlated observables   │
└──────────────────────────────────┘
           │        │
           │        v
           │   ┌──────────────┐
           │   │  Retrieval   │
           └──>│ coefficients │
               └──────────────┘
                      │
                      v
```

Atmospheric refractivity profiles, gradients, predicted profiles and gradients $$n(h), \frac{dn(h)}{dh}, \frac{d^2n(h)}{dh^2}$$

$$n(h,t), \frac{dn(h,t)}{dh}, \frac{d^2n(h,t)}{dh^2}$$

$$\frac{dn(h,t)}{dt}, \frac{d\left(\frac{dn(h,t)}{dh}\right)}{dt}, \frac{d\left(\frac{d^2n(h,t)}{dh^2}\right)}{dt}$$

ATMOSPHERIC REFRACTIVITY PROFILING APPARATUS AND METHODS

FIELD OF THE INVENTION

This invention relates to atmospheric profiling using passive microwave radiometry, and, more particularly, relates to such profiling for characterizing atmospheric refractivity and refractivity gradients.

BACKGROUND OF THE INVENTION

Radio and/or optical propagation paths are influenced by atmospheric refractivity in a manner that is often difficult to characterize and/or predict. Refractive gradients in the atmosphere due to the structure of temperature and water vapor fields can cause reflective layers that can duct or trap propagation. Optical mirages are the result of refractive gradients that cause upward bending thus precluding views of the surface at distances from the observer. Horizontal gradients in refractivity influence astronomical observations, celestial navigation, radar tracking of orbiting and other objects in flight, and other pointed observations.

Such atmospheric effects can preclude or divert propagation such that sources or receivers are hidden from view. On the other hand, ducts can create propagation paths that follow the curvature of the earth, thus enabling visibility or radio propagation over longer than normal distances. Ducting is most prominent over the oceans and can, for instance, either make vessels visible to radar at greater than normal ranges or, alternatively, make radar detection impossible, hiding surface hugging missiles or aircraft from detection. Long range radio communications are also subject to ducting and other effects of refractivity, and short radio links such as those associated with cellular communications can also be affected.

The ability to gauge and predict atmospheric refractivity would therefore be useful, and could be applied to enhance stealth and security as well as for improving communications, detection and/or observations of various types.

It has been suggested heretofore that microwave radiometer receivers, capable of determining the amount of atmospheric emission across spectral wavebands, can be used for profiling atmospheric temperature and moisture and, base thereon, predicting various parameters related to weather conditions (see U.S. Pat. Nos. 6,377,207, 6,308,043, 5,526,676 and 4,873,481). Adaptation of such receivers and systems for use in the field of atmospheric refractivity characterization and prediction has not been heretofore suggested, however, and could be utilized.

SUMMARY OF THE INVENTION

This invention provides apparatus and methods for characterization of atmospheric refractivity including refractivity gradients in real time utilizing passive remote observations. The apparatus and methods provide refractivity profiles that may including spatial characterization of refractivity gradients as well as predictive capability. The apparatus and methods may be applied to enhancement of stealth and security as well as to improvement of communications, detection and/or observations of various types. Passive observations are provided by a passive radiation emission measurement device such as a passive microwave receiver.

The methods of this invention provide real time determination of selected characteristics of atmospheric refractivity utilizing signals from a passive radiation emission measurement device. The device senses brightness temperature across at least one selected predictable atmospheric thermal radiation emission region and provides output signals indicative thereof. Refractivity characteristics retrieval coefficients are applied to these signals. The retrieval coefficients are derived from a retrieval system trained by refractivity characteristics calculated from a priori or modeled atmospheric states and correlative brightness temperature observables.

The real time observational data are at selected directions and elevation angles and in the spectral region between 0 and 200 Ghz. The correlative brightness temperature observables are obtained by modeling the a priori or modeled atmospheric state data which provides a correlated ensemble of radiometric brightness temperatures at various frequencies in the 0 to 200 Ghz region. The calculated refractivity characteristics include calculated refractivity profiles and derivatives thereof. Mathematical inversion methods are utilized for inverting the real time observational data into refractivity profiles and gradients thereof in real time.

The apparatus of this invention provides real time determination of selected characteristics of atmospheric refractivity and includes at least one passive radiation emission receiver for sensing brightness temperature across at least one selected predictable atmospheric thermal radiation emission region. Output signals from the receiver indicative thereof are provided to a processor which is also operatively associated with inputs for connection with various data sources. The processor includes a stage applying refractivity characteristics retrieval coefficients to the output signals and any data that may be received at any of the inputs. An output indicative of the selected characteristics of atmospheric refractivity of interest are obtained responsive thereto, which is communicated at a display, communication channel or by other output means.

Profiling to obtain temporal first and second derivatives of atmospheric refractivity profiles and/or their gradients and/or spatial variation of their gradients may be provided, as can processing to predict changes, spatially and/or temporally, in atmospheric refractivity profiles and/or their gradients and/or spatial variation of their gradients and/or first and second derivatives thereof.

It is therefore an object of this invention to provide apparatus and methods for profiling atmospheric refractivity characteristics.

It is another object of this invention to provide apparatus and methods for atmospheric refractivity characterization and prediction in real time.

It is therefore an object of this invention to provide apparatus and methods for atmospheric refractivity characterization applied to enhancement of stealth and security.

It is another object of this invention to provide apparatus and methods for atmospheric refractivity characterization applied to improvement of communications, detection and/or observations of various types.

It is another object of this invention to provide apparatus and methods for profiling atmospheric refractivity characteristics that includes utilizing a passive radiation emission measurement device such as a passive microwave receiver.

It is yet another object of this invention to provide apparatus and methods to obtain atmospheric refractivity profiles and/or their gradients.

It is yet another object of this invention to provide apparatus and methods for profiling atmospheric refractivity characteristics to obtain the spatial variation of refractivity profile gradients.

It is still another object of this invention to provide apparatus and methods for profiling atmospheric refractivity characteristics to obtain temporal first and second derivatives of atmospheric refractivity profiles and/or their gradients and/or spatial variation of their gradients.

It is yet another object of this invention to provide apparatus and methods for profiling atmospheric refractivity characteristics to predict changes, spatially and/or temporally, in atmospheric refractivity profiles and/or their gradients and/or spatial variation of their gradients and/or first and second derivatives thereof.

It is yet another object of this invention to provide a method for real time determination of selected characteristics of atmospheric refractivity utilizing signals from a passive radiation emission measurement device that includes the steps of sensing brightness temperature across at least one selected predictable atmospheric thermal radiation emission region at the measurement device and providing output signals indicative thereof, and applying refractivity characteristics retrieval coefficients to the signals, the retrieval coefficients provided from a retrieval system trained by refractivity characteristics calculated from a priori or modeled atmospheric states and correlative brightness temperature observables.

It is another object of this invention to provide an apparatus for real time determination of selected characteristics of atmospheric refractivity including at least a first passive radiation emission receiver for sensing brightness temperature across at least one selected predictable atmospheric thermal radiation emission region and providing output signals indicative thereof, a plurality of inputs for connection with various data sources, a processor receiving the output signals from the receiver and operatively associated with the inputs, the processor including a stage for applying refractivity characteristics retrieval coefficients to the output signals and data received at any of the inputs and responsive thereto obtain an output indicative of the selected characteristics of atmospheric refractivity of interest, and output means associated with the processor for communicating the output.

It is still another object of this invention to provide a method for determining selected refractive properties of the atmosphere that includes the steps of obtaining real time observational data from atmospheric observations at selected directions and elevations in the spectral region between 0 and 200 Ghz., gathering a priori or modeled atmospheric state data, modeling the a priori or modeled atmospheric state data to provide a correlated ensemble of radiometric brightness temperatures at various frequencies in the 0 to 200 Ghz region, providing calculated refractivity profiles and derivatives thereof from the a priori or modeled atmospheric state data, and utilizing the correlated ensemble and the calculated refractivity profiles and derivatives thereof to train a system for mathematically inverting the observational data into refractivity profiles and gradients thereof in real time.

With these and other objects in view, which will become apparent to one skilled in the art as the description proceeds, this invention resides in the novel construction, combination, and arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 4 is a flow chart illustrating a second stage of the method of this invention for constructing a data inversion mechanism to generate retrieval coefficients from a training set;

FIG. 5 is a flow chart illustrating a third stage of the method of this invention for operational implementation to retrieve atmospheric refractivity parameters and predict the evolution of atmospheric refractivity parameters;

DESCRIPTION OF THE INVENTION

Figure 1:
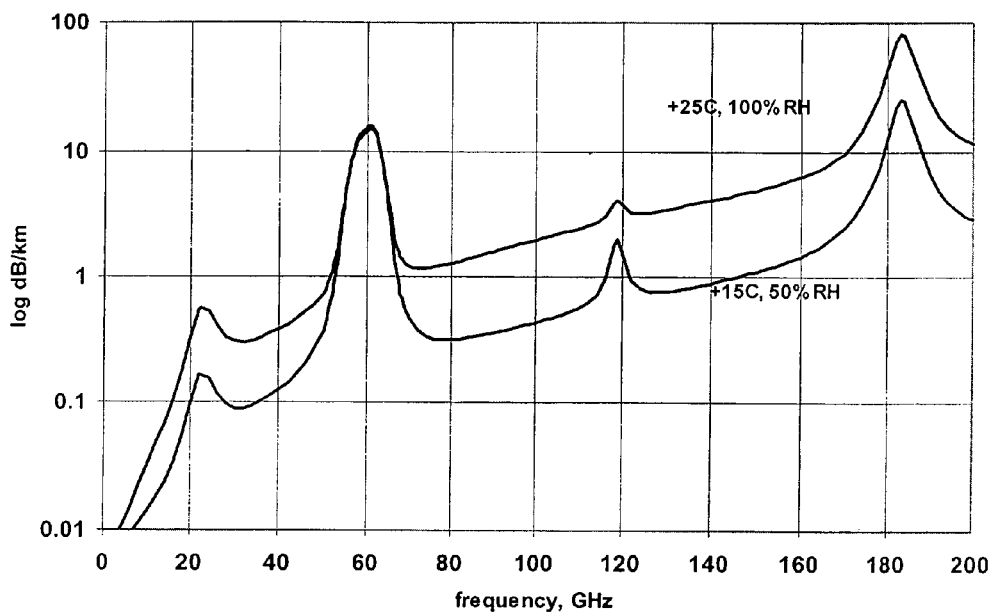
FIG. 1 is a graph plotting the atmospheric absorption spectrum from 10 to 200 Ghz.

The Earth's atmosphere emits thermal radiation in all wavebands that consists of blackbody radiation from both atmospheric atomic and molecular constituents. This emitted thermal radiation is reabsorbed and re-emitted by these atomic and molecular species. The absorption spectrum of the clear atmosphere in the microwave signal region from 10 GHz to 200 GHz (at sea level) is shown in graphical form in FIG. 1. The prominent peaks in this spectral region are caused by absorption lines or, equivalently, emission lines, of atmospheric water vapor and oxygen. Regions of the spectrum between these peaks have lower signal absorption and therefore are called transmission windows. The downwelling radiation reaching the Earth is expressed as brightness temperature, the temperature of a blackbody emitting equivalent radiation, and can be written in a linearized equation as:

$$T_b = T_{cosmic} e^{-T} + (1 - e^{-T}) T_{MR}$$

Where $T_{cosmic}$ is the residual radiation from the Big Bang, tau is the atmospheric opacity or optical depth, and $T_{MR}$ is the mean radiating temperature of the atmosphere. Accordingly, the clear-air brightness temperature contribution from a given layer in the atmosphere is:

$$T_b(h) = T(z)[1 - e^{-k_{abs}\Delta z}] + e^{-k_{abs}\Delta z} T_b(z + \Delta z)$$

where $T_b$ is the brightness temperature, z is the vertical coordinate (height), and $k_{abs}$ is the absorption coefficient.

A perfect emitter ($k_{abs}$ approaching infinity) radiates a brightness temperature equal to its physical (or, kinetic) temperature. As is known, microwave radiometer receivers are able to determine the amount of atmospheric emission across spectral wavebands and/or at various elevation angles of observation. Contained in this emission as a function of frequency and as a function of the elevation angle of observation is information on the vertical distribution of the absorbers and other meteorological parameters. Passive microwave radiometers are capable of receiving and resolving such radio signals emitted by the atmosphere. Thus, the spatial concentration of absorbers such as water vapor and liquid water along the path of observation can be determined. Additionally, the temperature along this path can be determined by the spectral shape and intensity of emissions of well distributed atmospheric gases such as oxygen.

The process of inverting the observational data of microwave spectral power into the desired tropospheric parameters is called "retrieval" of these parameters. This can be accomplished through a myriad of mathematical methods. Some of the most effective and commonly utilized are linear and quadratic regressions, artificial neural networks, and Bayesian and Newtonian iterative methods. These methods require "training" the retrieval system upon an ensemble of possible a priori atmospheric states and their correlated observables from the radiometric profiling system. This training enables the retrieval method to recognize atmospheric states from radiometric and other observations. Retrievals based solely upon physical modeling of the atmosphere are also possible, but inclusion of a priori climatological data from radiosondes or the like in the training ensemble increases the accuracy of the retrieval methodology by limiting the possible atmospheric states to those that physically occur.

Figure 2:
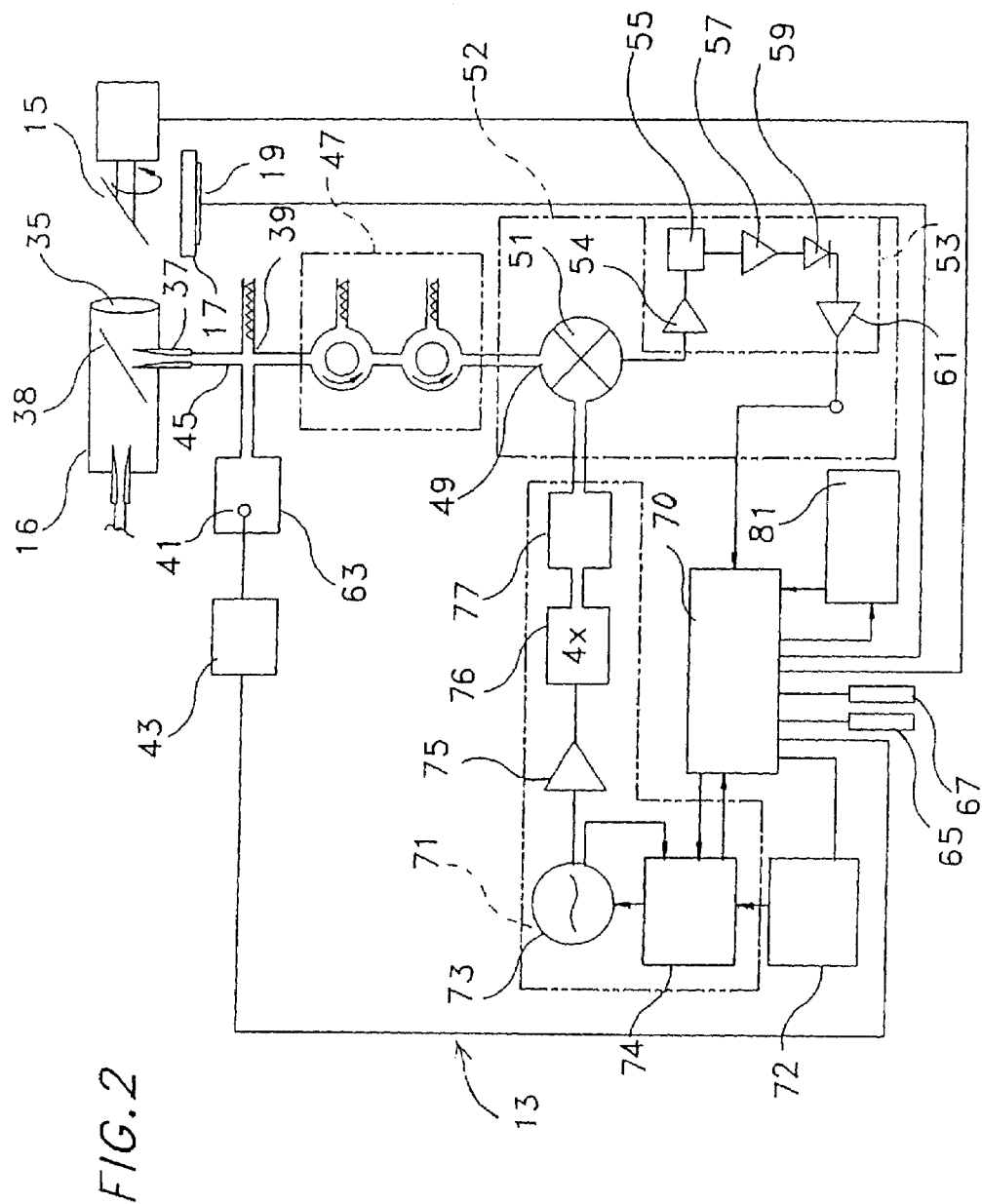
FIG. 2 is a block diagram illustrating one embodiment of an apparatus for atmospheric refractivity profiling of this invention.

An apparatus 13 of this invention for atmospheric refractivity profiling is illustrated in FIG. 2. Apparatus 13 is a passive microwave receiver system, also called a passive microwave radiometer, that can determine profiles of the various physical parameters of the atmosphere over a plurality of selected altitudes to a high degree of accuracy. The profile measurements are accomplished by a series of observations of the sky at different frequencies and/or different elevation angles of observation.

The radiometer is mounted in a housing and includes mirror 15 and is steerable to point to all elevation angles (for zenithal observations) and directional angles (for azimuthal observations) and thus to all sky vectors. When pointed downward, the field of view of antenna 16 is filled with black body 17 of a known temperature as determined and updated by reference to temperature sensor 19. Observing black body 17 establishes the receiver offset. When pointed upward through a window in the housing, atmospheric emissions having frequencies of interest are received and observed. A side lobe collar may be employed, as is known, to negate the effects of antenna side lobes of dual feed Gaussian optical antenna 16. Standard PC and power connectors are provided.

Antenna 16, having lens 35 thereat, includes corrugated feed horn 37 receiving microwave emissions, and thus the frequencies of interest, as focused by lens 35. Antenna 16, where multiple receivers are used, may include signal splitter 38. One polarization thereof is reflected 90°, by placing the grid at 45° to the axis of the beam, and thus focused into corrugated feed horn 37.

Directional coupler 39 injects signal of known equivalent temperature from stabilized noise diode 41 connected with driver 43 into antenna waveguide 45 when the noise diode is on. Measuring the contribution of the injected signal to the receiver output establishes the gain of the receiver. The passive radiometer can be constructed with waveguide of predetermined size, or can be constructed utilizing other known methods.

Coupler 39 is followed by isolator 47 (preferably having a band width of about 8 GHz) to prevent local oscillator leakage from RF port 49 of mixer 51 from exiting and re-entering antenna 16 as an error source. Downconversion system 52, including biased mixer 51, is followed by signal conditioning system 53 having amplification stage 54, IF filtering stage 55, further amplification stage 57, detection by square law detector 59, and current amplification stage 61.

The accuracy of the radiometer receiver is dependent upon the stability and resolving power of the receiver and of the stability of the noise diode gain reference. To increase the stability of noise diode 41, its mount 63 is held at a constant temperature.

Ambient sensors 65 and 67 (which may include surface temperature, relative humidity and barometric pressure sensors, and may be supplemented by additional sensors or inputs as discussed below) are provided to enhance profiling when properly modeled into the profile inversion software as discussed hereinafter.

The radiometer is controlled with high level commands from computer 81. All data is logged onto the PC hard disk, and reduced data may be displayed to the PC screen. Programming at computer 81 conveys simple commands to onboard microprocessor 70 which translates these commands to low level control of the various radiometer systems and receives data output from microprocessor 70. Microprocessor 70 controls the pointing of antenna mirror 15, turns on and off the various oscillators and noise diode 41, monitors temperatures and pressures, and measures system and reference voltages.

The downconversion mixer 51 of this receiver is driven by processor controlled tunable frequency device 71 that is referenced to a stable reference 72 for receiver frequency accuracy and stability. The receiver is mounted on a temperature stabilized plate for stability. Device 71 includes a tuner 73 tuned by frequency control 74 under operational control from microprocessor 70. A feed back loop between tuner 73 and control 74 assures stability of output. The output from device 71 is amplified by amplifier 75 and fed to frequency quadrupler 76 and bandpass filter 77. This signal is then fed into the volume of biased mixer 51, where the signal from the antenna system is downconverted.

Because of their ability to measure atmospheric parameters, with proper interpretation and processing of the observed data, microwave radiometers and associated ancillary observing systems can measure profiles of atmospheric refractivity, their gradients, and the trending of these gradients in space and time. This sensor system can directly produce refractivity profiles, their gradients (calculus first derivatives with respect to height), and spatial and/or temporal trends of gradients (second derivatives with respect to height). Because this sensor system can be pointed to any direction in the sky, directional and three dimensional information on refractivity can be obtained. Predictive information can be obtained either from the time series of these data, from the directional observations, or from both in concert. Ancillary predictive information such as that from weather forecast models can be included in the input data for prediction processing. Because microwaves penetrate weather, the system operates in the absence or presence of cloud, rain, fog, and/or snow.

Figure 3:
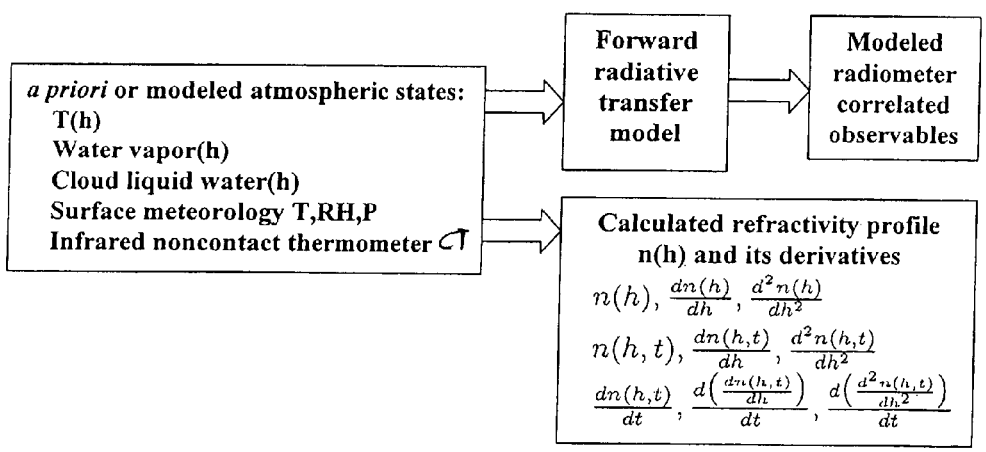
FIG. 3 is a flow chart illustrating one stage of the method of this invention for forward modeling the thermodynamic state of the atmosphere from soundings and calculating refractivity parameters from those soundings; presents the generation of a training set for retrieval.

A first embodiment of a method of determination of atmospheric refractivity profiles embodied in and utilizing the apparatus of FIG. 2 is shown in FIGS. 3 through 5.

Atmospheric index of refraction is a measure of the group propagation velocity of electromagnetic propagation from the in vacuo velocity (speed of light, c) and is expressed as the ratio:

$$n = \left(\frac{\text{velocity in } vacuo, c}{\text{group propagation velocity}}\right)$$

Refractivity (N) is the deviation of this ratio from 1, multiplied by $10^6$:

$$N = (n-1) \times 10^6 = \left(\frac{c}{v_{group}} - 1\right) \times 10^6$$

The modified refractive index ($n_{mod}$) essentially flattens the curvature of the Earth:

$$n_{mod} = n + \frac{z}{R}$$

where R is the Earth's radius and z is the height above the Earth's surface. The modified refractivity is thus:

$$M = \left(n + \frac{z}{R} - 1\right) \times 10^6$$

The atmospheric refractivity at radio frequencies (15,000 to $10^{11}$ Hertz) can be written empirically as the sum of the refractivity due to the dry atmospheric gases plus that due to water vapor:

$$N = N_{dry} + Nvapor = k_1 \frac{P_{dry}}{T} + k_2 \frac{P_{vapor}}{T} + k_3 \frac{P_{vapor}}{T^2}$$

where $P_{dry}$ is the atmospheric pressure and $P_{vapor}$ is the pressure of water vapor, and $k_1$, $k_2$, and $k_3$ are constants. Refractivity is due to the displacement of electrons relative to the nuclei of the atmospheric constituents by the propagating electromagnetic field and by the alignment of polar molecules such as water vapor with the electromagnetic field. Vertical gradients in this refractivity induce bending in the propagation path of electromagnetic radiation. If the vertical gradient of refractivity is about minus 16 N units per 100 meters, horizontal propagation will follow the curvature of the Earth. Gradients of this magnitude or larger can form a waveguide in the atmosphere and cause ducting of propagation, enabling direct long range propagation. Receipt or observation of propagation at locations other than within this duct are diminished or prevented. Negative gradients of greater magnitude will bend propagation toward or into the Earth's surface. Positive gradients steer propagation upward, making propagation between two Earth bound points difficult or impossible. More complex gradient structures can form ducts or channels elevated above the Earth's surface.

The apparatus and methods of this invention utilize a "training" set consisting of an ensemble of atmospheric thermodynamic parameters (temperature profile or T(h), relative humidity profile or RH(h), water vapor density V(h), the pressure profile or P(h), cloud liquid water density profile or LWC(h), cloud base temperature CT(h), and the like), corresponding atmospheric refractivity parameters and derivatives (n(h) etc.), and the corresponding radiometric brightness temperatures.

As shown in FIG. 3, the ensemble of atmospheric thermodynamic parameter data consisting of radiosonde or other soundings is processed through a known forward radiative transfer model, for example the model described in the National Oceanic and Atmospheric Administration (NOAA) Technical Memorandum ERL-WPL-213. Quality control is performed on the radiosondes before they are included in the ensemble to ensure that the data are good and the radiosonde has not malfunctioned. This forward modeling process generates a correlated ensemble of radiometric brightness temperatures at various frequencies between 22 and 30 GHz (sensitive to atmospheric profile of refractivity due to water vapor) and 51 and 60 Ghz (sensitive to the effect of atmospheric temperature upon the atmospheric profile of refractivity). Frequencies extending to the lower side of the 22.235 Ghz water vapor resonance and/or frequencies on the higher frequency side of the assemblage of oxygen resonances centered at 60 Ghz could also be utilized to sense the effect of water vapor and temperature upon refractivity. Frequencies proximate to the water vapor line at 183.3 Ghz or other predictable water vapor resonance can also be utilized in conjunction with or instead of the frequencies proximate to the 22.235 Ghz water vapor line. Frequencies proximate to the oxygen resonance at 118.75 Ghz or other predictable absorptive resonances can also be utilized in conjunction with or instead of the frequencies across the assemblage of oxygen resonances centered at 60 Ghz and spanning approximately 50 to 70 Ghz. Because most radiosondes do not directly measure the presence and density of cloud liquid water, also generated are profiles of cloud liquid water and the temperature of the base of the cloud when the soundings infer the presence of cloud. Because of the desired spatial and temporal resolution of the atmospheric thermodynamic parameters, frequent high resolution sondes are utilized.

The radiosondes can be specific to a site or climatology or season, or can be broader by including a plurality of sites, climatologies and/or seasons. In one alternative, other atmospheric data such as artificially generated model atmospheres can also be used.

The corresponding profiles of refractivity and their first and second calculus derivatives with respect to height and the time derivatives of these three parameters are also calculated using the equation above for determining atmospheric refractivity at radio frequencies (i.e., the sum of the refractivity due to the dry atmospheric gases plus that due to water vapor) and numerical differentiation of the refractivity profiles.

As shown in FIG. 4, a data inversion system is constructed by presenting this training set to a simulation system (methodology or program) that relates the observed parameters to the state of the atmosphere (for example, the Stuttgart Neural Network Simulator utilizing a standard feed forward/back propagation artificial neural network method to generate the requisite neural networks, or retrieval coefficients, it being understood that other systems and methods as discussed below could be utilized). Training is performed until the residual errors of the retrieved values of the atmospheric refractivity state parameter retrieval coefficients, as expressed in an objective or cost function, are brought below a defined threshold.

The refractivity retrieval algorithm utilized by the apparatus of this invention is a mathematical method that transforms observables (parameters that are measured by an observation device, such as atmospheric brightness temperature, surface barometric pressure, atmospheric radiance fluxes, and the like) into information on the present and/or future state of atmospheric refractivity. The state of atmospheric refractivity can include 1-, 2- or 3-dimensional refractivity information. The observables include radiometer measurements of radiances from the atmosphere and its environment, meteorological measurements (temperature, humidity, atmospheric pressure and the like) taken by traditional instruments, satellite observations, radar observation and other data measurements that contain information on the refractive state of the atmosphere.

There are a number of mathematical methods that can be utilized to develop a retrieval algorithm useful for retrieving refractive state data from the observables. These methods include linear regression retrievals wherein a matrix is formed such that, when multiplied against a vector of the observables, the resultant vector of atmospheric state parameters (the parameters that define the refractivity profile in the atmosphere, its spatial gradients and time derivatives, the time and/or spatial derivative of its gradients, and/or the evolution of any or all of these parameters) is minimally in error of the true atmospheric states, usually in a least squares sense.

As discussed above, one method of generating a training set (the ensemble or collection of modeled atmospheric refractivity states, such as distribution of refractivity in the atmosphere, and the corresponding sensing system observables, which states and observables are related to "train" the retrieval algorithm) is to forward model observables from a set of atmospheric thermodynamic soundings and calculate refractivity states from the soundings. The forward modeled observables and the correlated refractivity states comprise the training set. Mathematically, the matrix that relates observables to refractivity states can be formed, or "trained", by utilizing multivariate regression methods.

The training set could also be created by collecting simultaneous and/or time delayed atmospheric states and the correlated set of observables. The training set could also be synthetically created without utilizing observed atmospheric states, but rather by modeling the refractive state of the atmosphere utilizing physical and thermodynamic models of ensembles of atmospheric states and calculating the refractive states of each of the ensembles. Using, in addition, data reflective of the actual possible and probable states of the atmosphere, or climatological date, can significantly increase the skill of the refractivity retrieval algorithm.

Another retrieval algorithm consists of artificial neural networking (ANN) methods, wherein a number of input nodes (representing the observables) are linked to a number of output nodes (representing the atmospheric refractivity state parameters) through layers of summing nodes, each of which is linked to nodes of the adjacent layers by mathematical representation of biological neurons. Each neuron has a response function and strength for each of its neural connections. One standard method of "training" an artificial neural network (i.e., enhancing the output accuracy thereof) utilizes the back propagation-feed forward methods discussed above. Other mathematical methods for generating retrieval algorithms include Bayesian maximum probability, regularization, maximum likelihood, and/or iterative techniques.

As illustrated in FIG. 5, the passive microwave receiver system 13 of FIG. 2 is utilized to obtain real time measurements of brightness temperature across the pressure broadened emission line centered at 22.235 Ghz and/or at 183.3 Ghz or other predictable water vapor resonance, in the window region at 30 GHz, and on either side of the overlapping assemblage of oxygen emission lines from 51 to 69 GHz. The atmospheric spectrum in this region is shown in FIG. 1. The spectral power from these measurements contains information on the vertical refractivity profile due to the distribution of water vapor, temperature, and cloud liquid water. Additionally, surface meteorological measurements of temperature, barometric pressure, and relative humidity may be taken and utilized. A measurement of the temperature of the base of cloud, if present, may be taken with an infrared noncontact thermometer observing in an atmospheric window between 9 and 11 microns.

The retrieval coefficients obtained by the implemented simulation system or method (the trained retrieval algorithm) are applied to the radiometer observables (brightness temperatures) and measured surface meteorology and cloud base temperature if provided. Available ancillary data may also be included in data input to the apparatus, ancillary data including, for example, data from other systems or models that contain information pertinent to refractivity. Other ancillary data sources may include weather models, weather forecasts, satellite weather data, GPS data, lidar input, aircraft borne sensors, wind drift, balloon-borne sensors, and observational data related to wind drift, wind, turbulence, lower boundary layer in situ, climatological, diurnal and seasonal effects, or other such observations and information. The Pennsylvania State/NCAR MM5 model (hereinafter MM5) is a skillful portrayer of current meteorological conditions over broad areas, and can be updated and improved with inputs including the observations from the instant radiometer system.

Figure 6:
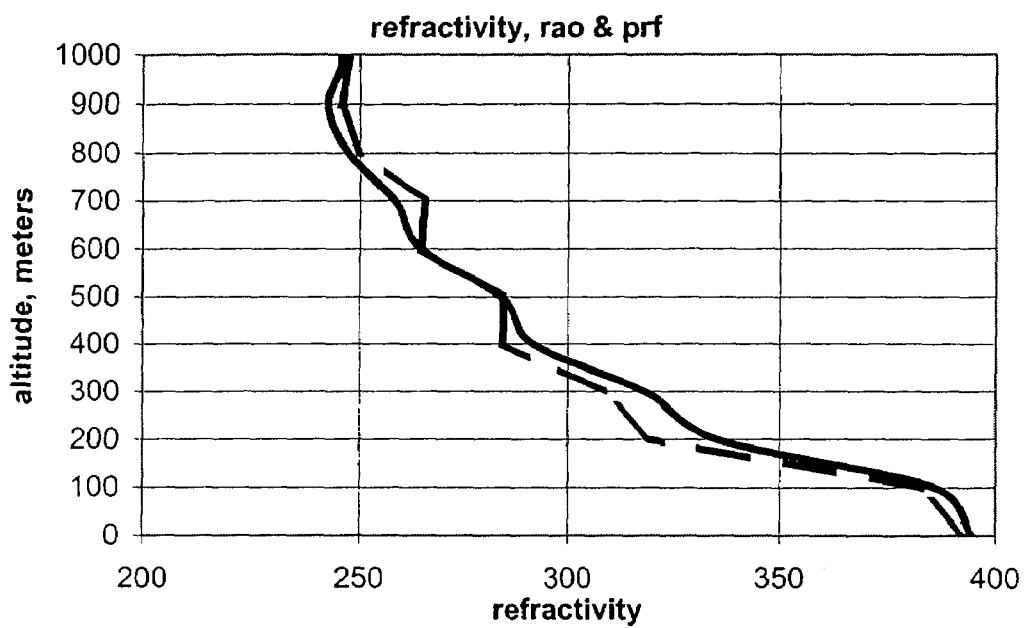
FIG. 6 is a graph plotting a refractivity profile calculated from radiosonde measurements against one retrieved from microwave radiometer system measurements utilizing the apparatus and methods of this invention.
Figure 7:
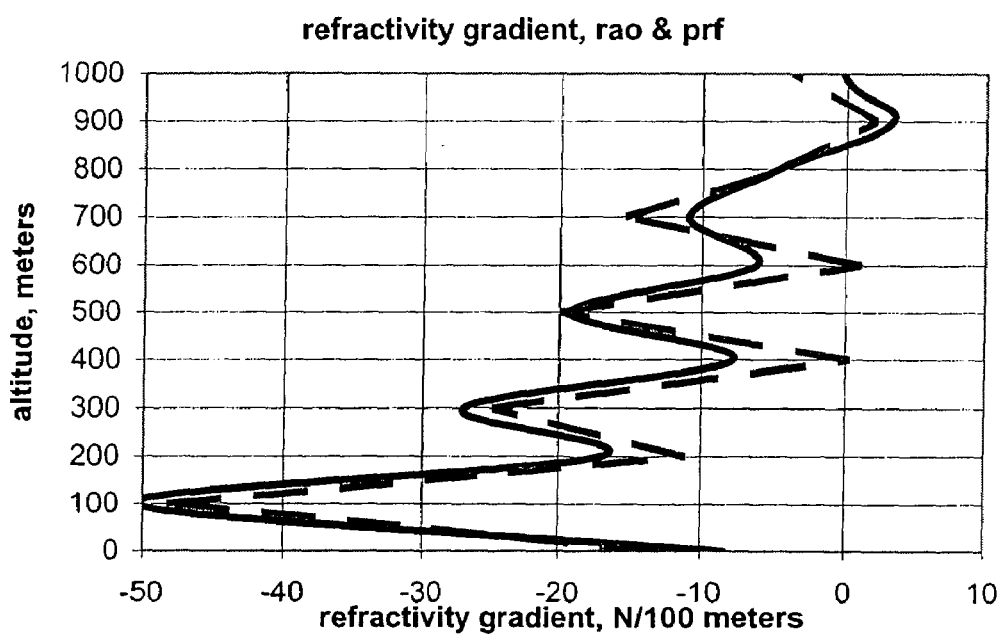
FIG. 7 is a graph plotting a refractivity gradient profile calculated from radiosonde measurements against one retrieved from microwave radiometer system measurements utilizing the apparatus and methods of this invention.

Upon application of the retrieval coefficients, the desired refractivity profiles and their spatial and temporal calculus derivatives (providing spatial and temporal refractivity gradients) are determined from the provided real time observables and ancillary data (if any). Sample profiles of the refractivity profile as calculated from a radiosondes sounding (dashed line) and as measured by a microwave radiometer system and retrieved by the invention (solid line) are shown in FIG. 6. An example of the refractivity gradient profile as calculated from a radiosondes sounding (dashed line) and as measured by a microwave radiometer system and retrieved by the invention (solid line) are shown in FIG. 7. In both cases, accurate correlation is obtained.

Figure 8:
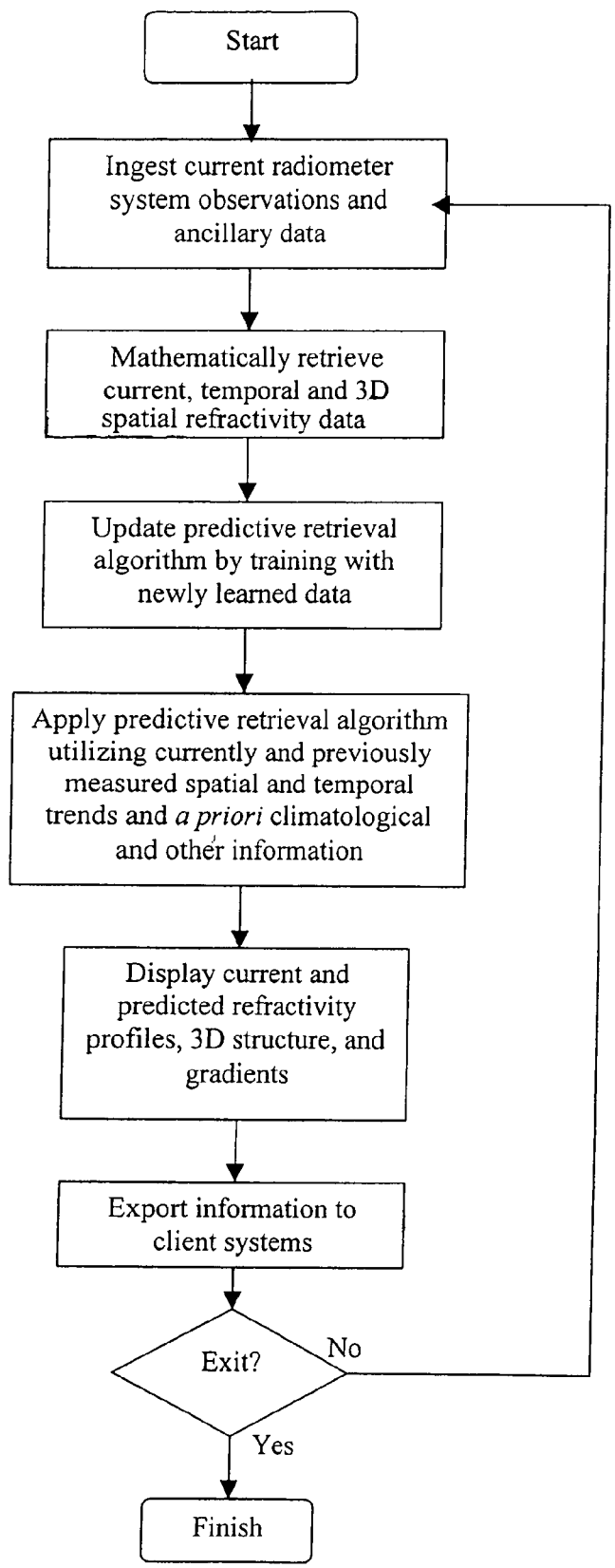
FIG. 8 is another flow chart illustrating the method for prediction of evolution of atmospheric refractivity parameters utilizing retrieved atmospheric refractivity parameters and other observational data.

As shown in FIG. 8, predictions of future refractivity fields may be embodied in the apparatus and methods of this invention, and are made based on the time series and trending of the current and previous refractivity observations made utilizing the apparatus and methods of this invention. The prediction data set may be embodied in local or offsite software, which is also "trainable" and updated utilizing the methods similar to those above-described. The prediction data set may also incorporate MM5 and/or other weather forecasts. Localized weather models imbedded in synoptic weather models can give high resolution of meteorological parameters. These data are presented to an additional artificial neural network that has been trained on time series of refractivity data from radiosondes and from the instant radiometer system refractivity output. From this application of the predictive retrieval algorithm/coefficients, output (display or other communication) of both current and predicted refractivity profiles, 3D structure and gradients is obtained. Weather model data are used if there is a shortage of training data from radiosondes and radiometer system data. The artificial neural network (or other simulation system or method) is also structured to further learn the evolution of refractivity under experienced conditions.

Figure 9:
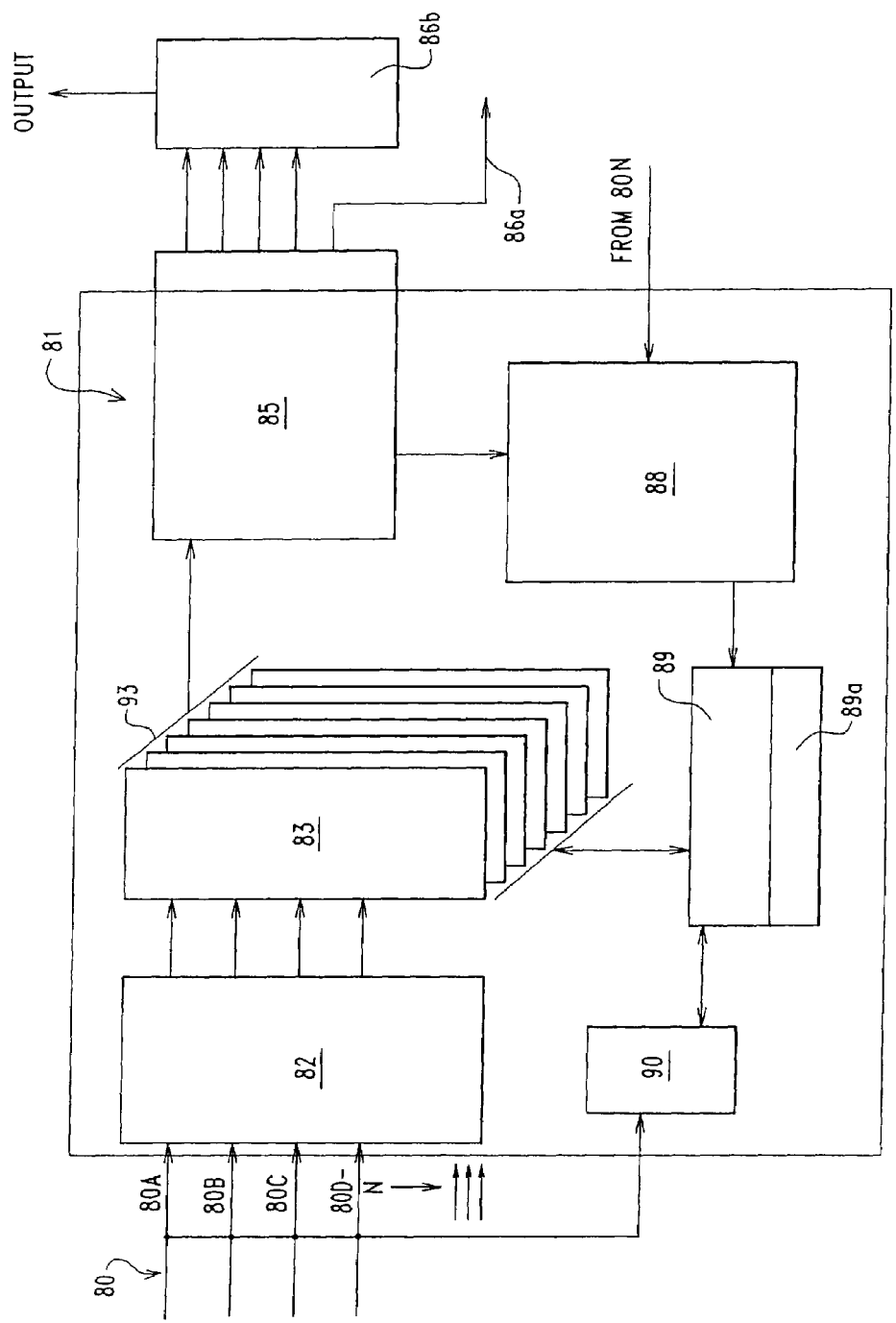
FIG. 9 is a block diagram illustrating one embodiment of data manipulation structures utilized in conjunction with the apparatus and methods of this invention

FIG. 9 is a block diagram illustrating a refractivity profile/gradients and prediction (forecast) retrieval system utilized with the apparatus of this invention which utilizes the above-identified data signatures and observed relationships to derive the profiles. Raw data from the various selected observing sensor or sensors are input at 80 (either from microprocessor 70 or utilizing hard wired inputs, ports, or by known remote transmission techniques) to processor 81 (a personal computer, for example). For example, cloud base temperature monitoring data is provided at input 80A, site-based scanning radiometer data at input 80B, site-based barometric pressure measurement data at input 80C, and site-based ground measurement data (temperature, relative humidity and the like) as well as other selected, local or non-local data if desired) at inputs 80D through 80N.

These indicia can be optionally conditioned at preprocessing stage 82 by any of a variety of methods including fitness (regression coefficients) standard deviation, slope and average techniques, any of a number of mathematical transforms (Fourier or wavelet, for example), and other filtering or processes that enhance selected data features (i.e., the signatures of value in the raw data) and suppress noise in the input data. Wavelet transforms are preferred for extraction of the trending and other structural features from the radiometer and other data which are then utilized as inputs to the system. The goal of the algorithm utilized is to produce values that can be used to retrieve current, temporal and 3D spatial refractivity data.

The preprocessed data are presented to a hardware or, as now utilized, software system stage 83 embodying a model of the predictive retrieval algorithm as a function of the observable and correlated data types to both update (i.e., further "train") the predictive algorithm and to apply the predictive retrieval algorithm to the processed data in view of previously measured spatial and temporal trends and/or a priori data and other information. The system may employ linear statistical retrieval methods, maximum likelihood methods, Artificial Neural Network methods as discussed above, or the like. Output from system stage 83 yields the desired prediction at signal output conditioning stage 85, which may be entirely resident in processor 81, entirely independent therefrom, or a combination thereof. Stage 85 may include, or may correspond with, an output display node 86b and/or other means of data communication (for example land line or broadcast system output 86a).

The system can be made adaptive in that it can self-train to yield refractivity trending data and/or accommodate seasonal or climatic trends, change in sensor sensitivity, accuracy, or noise, loss of data or data input 80, or other deficiencies in the hardware system or processing method. This could be accomplished by comparing the predicted condition with the subsequent actual condition at comparing stage 88, and then updating the model or mathematical inversion system training stage 89.

Comparing stage 88 (including means for short term delay of the conditioned prediction signal received from stage 85, such as buffer memory or delay line technique) includes an input from 80N providing updated real time measured data, if available, related to refractivity predictions provided by the apparatus and methods of this invention. The prediction signal is then compared to the real time state of the data link, and an output (indicative of a numerical error) is provided to training stage 89. Training stage 89 is provided access to memory 89a containing initial training history and read/write access to buffer memory 90 (for example a set time period circular buffer) containing recent data indicative of the inputs from sensors at inputs 80. The error signal can be utilized at stage 89 continually for ongoing training at stage 83 or periodically as needed.

The apparatus and methods can be accommodated to concurrently sample parameters from a plurality of observing apparatus separated spatially, for example utilizing a grid of observing apparatus, and from various platforms such as a fleet or other plurality of ocean vessels each equipped with observing apparatus (and operable from either or both stationary and moving platforms). The apparatus and methods and be employed and practiced to profile atmospheric refractivity characteristics by spatially and temporally sampling parameters from an observing system in motion (for example, by equipping a vessel under way with an observing apparatus of this invention to thereby yield spatial and temporal information). Utilization of a spatial array of radiometric sensing devices in the apparatus of this invention, for instance, located on a fleet of ships, buoys, and/or land-based mobile or fixed stations, and communicating all data from the plural sources to a central processor can provide regional atmospheric refractivity mapping.

The remote sensing apparatus and methods of the present invention measure signatures of atmospheric conditions indicative of refractivity profile and gradient data of interest. The apparatus can observe to any vector in the sky, giving directional as well as zenithal measurements of the obtained refractivity profile, its spatial and temporal gradients, and the spatial and temporal trending of the profile and its gradients. Alternative passive radiation emission measurement systems are applicable herein to provide such measurements, and these and others as may be known or become known to those skilled in the art, as well as those equivalent to heretofore known apparatus and methods, are meant to be encompassed within the scope of the following claims.

What is claimed is:

1. A method for real time determination of selected characteristics of atmospheric refractivity including a refractivity profile utilizing signals from a passive radiation emission measurement device comprising the steps of:
   sensing brightness temperature across at least one selected predictable atmospheric thermal radiation emission region at the measurement device and providing output signals indicative thereof; and
   directly applying refractivity characteristics retrieval coefficients to said signals to obtain the selected real time atmospheric characteristics including the refractivity profile, said retrieval coefficients provided from a retrieval system trained by refractivity characteristics calculated from a priori or modeled atmospheric states and correlative brightness temperature observables.

2. The method of claim 1 wherein said refractivity characteristics are calculated from a priori or modeled atmospheric states including calculated refractivity profiles.

3. The method of claim 1 wherein the selected characteristics of atmospheric refractivity include gradients in atmospheric refractivity, said refractivity characteristics calculated from a priori or modeled atmospheric states including calculated refractivity gradients.

4. The method of claim 1 wherein the selected characteristics of atmospheric refractivity include spatial variation of refractivity gradients, said refractivity characteristics calculated from a priori or modeled atmospheric states including calculated derivatives of refractivity profiles.

5. The method of claim 1 wherein said refractivity characteristics calculated from a priori or modeled atmospheric states include calculated refractivity profiles.

6. The method of claim 1 wherein said at least one selected predictable atmospheric thermal radiation emission region is at least one of a water vapor emission line at about 22.235 GHz, a water vapor emission line at 183.3 Ghz, the transmission window region at about 30 GHz, and an oxygen emission assemblage from 51 to 69 Ghz.

7. The method of claim 1 further comprising the steps providing an output indicative of the selected characteristics of atmospheric refractivity of interest determined from the step of applying refractivity characteristics retrieval coefficients to said signals, updating a predictive retrieval system with said output, and applying refractivity trending retrieval coefficients obtained from said predictive retrieval system to provide forecast of the selected characteristics of atmospheric refractivity of interest.

8. An apparatus for real time determination of selected characteristics of atmospheric refractivity including a refractivity profile comprising:
at least a first passive radiation emission receiver for sensing brightness temperature across at least one selected predictable atmospheric thermal radiation emission region and providing output signals indicative thereof;
a plurality of inputs for connection with various data sources;
a processor receiving said output signals from said receiver and operatively associated with said inputs, said processor including a stage for directly applying refractivity characteristics retrieval coefficients to said output signals and data received at any of said inputs and responsive thereto obtain an output indicative of the selected characteristics of atmospheric refractivity of interest including the refractivity profile; and
output means associated with said processor for communicating said output.

9. The apparatus of claim 8 wherein said processor includes a loop for applying said output to further refine said retrieval coefficients.

10. The apparatus of claim 9 wherein said processor includes a training stage associated with said plurality of inputs and said loop, said retrieval coefficients provided and refined at said training stage responsive to refractivity characteristics calculated from a priori or modeled atmospheric states, correlative brightness temperature observables, and said output.

11. The apparatus of claim 8 wherein said first passive radiation emission receiver is part of a spatial array of passive radiation emission receivers.

12. The apparatus of claim 8 wherein said inputs include at least one of surface meteorology data inputs, a cloud base temperature input, a priori or modeled atmospheric states data input, ancillary atmospheric observational and informational data inputs, or modeled atmospheric observational and informational data inputs.

13. The apparatus of claim 8 wherein said first passive radiation emission receiver includes steering means for observation of any vector in the sky, giving azimuthally as well as zenithally scanned observations, and wherein said processor includes processing at said stage to provide refractivity profile output, spatial and temporal refractivity gradient output, output indicative of spatial and temporal trending of said profile output and said gradient output, and output interpreting azimuthally scanned observations to determine three dimensional refractivity structure.

14. A method for real time determination of selected characteristics of atmospheric refractivity including temporal first and second derivatives of atmospheric refractivity profiles, gradients and spatial variation of gradients, the method utilizing signals from a passive radiation emission measurement device and comprising the steps of:
sensing brightness temperature across at least one selected predictable atmospheric thermal radiation emission region at the measurement device and providing output signals indicative thereof; and
applying refractivity characteristics retrieval coefficients to said signals, said retrieval coefficients provided from a retrieval system trained by refractivity characteristics calculated from a priori or modeled atmospheric states and correlative brightness temperature observables, said refractivity characteristics calculated from a priori or modeled atmospheric states including calculated refractivity profiles and first and second derivatives of said calculated refractivity profiles.

15. The method of claim 14 wherein the step of sensing brightness temperature includes obtaining real time observational data at the measurement device from atmospheric observations at selected directions and elevations in selected spectral regions, and wherein the method further comprises the steps of gathering a priori or modeled atmospheric state data, modeling said a priori or modeled atmospheric state data to provide a correlated ensemble of radiometric brightness temperatures at various frequencies, and utilizing said correlated ensemble and said calculated refractivity profiles and derivatives thereof to train said retrieval system.

16. The method of claim 14 wherein the step of sensing brightness temperature includes obtaining real time observational data, and wherein said retrieval system and said retrieval coefficients are for mathematically inverting said observational data into the refractivity profiles and gradients thereof in real time.

17. The method of claim 16 further comprising the steps of obtaining real time observations from measurements of surface meteorology and cloud base temperature and utilizing said observations in said retrieval system for mathematically inverting said observational data into the refractivity profiles and gradients thereof in real time.

18. The method of claim 14 wherein the step of sensing brightness temperature includes obtaining real time observational data, said method further comprising utilizing a correlated ensemble of radiometric brightness temperatures and said calculated refractivity profiles and derivatives thereof to train said retrieval system for mathematically inverting said observational data into forecasts of the refractivity profiles.

19. The method of claim 14 wherein the step of sensing brightness temperature includes obtaining real time observational data, said method further comprising utilizing a correlated ensemble of radiometric brightness temperatures and said calculated refractivity profiles and derivatives thereof to train said retrieval system for mathematically inverting said observational data into forecasts of the spatial gradients of the refractivity profiles.

20. The method of claim 14 further comprising the steps of providing an output indicative of the refractivity profiles and gradients thereof, updating a predictive retrieval system with said output, and applying refractivity trending retrieval coefficients obtained from said predictive retrieval system to provide predictive outputs indicative of temporal evolution of selected refractive properties of interest.

* * * * *